March 27, 1962     S. FREED     3,026,782
LIGHT METER MOUNTING

Filed June 1, 1960

INVENTOR
SIDNEY FREED

BY *Albert J. Kramer*
ATTORNEY 3,026,782
LIGHT METER MOUNTING
Sidney Freed, Silver Spring, Md., assignor to U.S. Photo Supply Co., Inc., Washington, D.C., a corporation of Delaware
Filed June 1, 1960, Ser. No. 33,327
5 Claims. (Cl. 95—10)

This invention relates to mounting devices and it is more particularly concerned with means for mounting on a camera a light meter to be used in the operation of the camera.

In conventional cameras which are not provided with built in light meters or automatic means for controlling the aperture of the lens, it is difficult and frequently irksome to employ a separate light meter and make the necessary adjustments in the camera indicated by the meter, because of the manipulations required in handling two separate instruments. Accordingly, an object of the invention is the provision of mounting means by virtue of which a conventional type of light meter can be quickly and removably mounted on the side of a camera to virtually become unitary and permit them to be handled by the operator as a single instrument.

Another object is the provision of means for supporting a light meter on a camera in a position adjacent the camera lens and facing the same direction as the camera lens so that light falling on the lens and on the meter will be of substantially the same value at any given time.

A still further object of the invention is the provision of such mounting means which is simple to manufacture, inexpensive, and easy to use.

These and still further objects, advantages and features of the invention will appear more fully hereinafter, considered together with the accompanying drawing.

Figure 1:
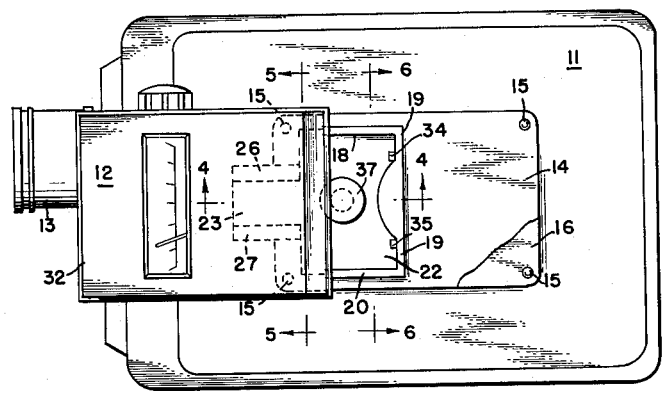
FIG. 1 is a side elevational view of an embodiment of the invention applied to hold a light meter on a conventional type of motion picture camera, partly broken away.
Figure 2:
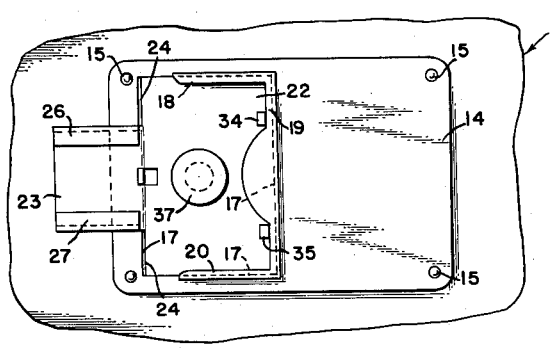
FIG. 2 is a fragmentary view of FIG. 1 with the light meter removed.
Figure 3:
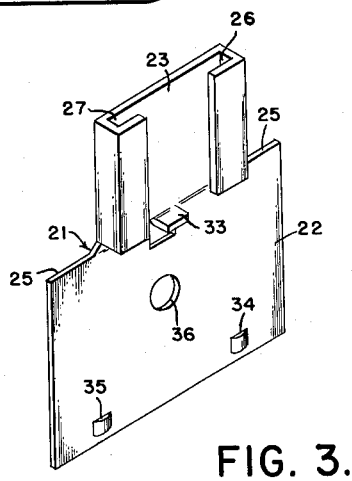
FIG. 3 is a perspective view of the adapter, apart from the camera and light meter.
Figure 4:
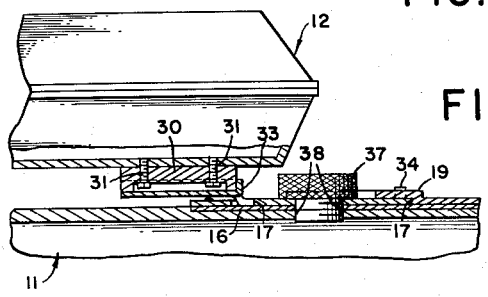
FIG. 4 is a section along the line 4—4 of FIG. 1.
Figure 6:
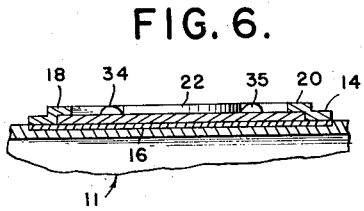
FIG. 6 is a section along the line 6—6 of FIG. 1.
Figure 5:
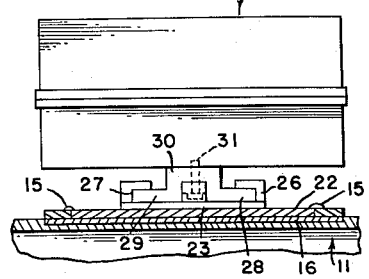
FIG. 5 is a section along the line 5—5 of FIG. 1.

Referring with more particularity to the drawing in which like numerals designate like parts, the embodiment is illustrated in connection with a camera 11 and light meter 12. The camera is of a conventional type having a lens tube 13 projecting at the front end. One side of the camera is provided with a rectangular outer plate 14 which is secured to the camera housing by rivets 15. Between the plate 14 and the housing of the camera is an inner plate 16.

The forward section of the outer plate 14 is provided with a cut out area 17 of generally rectangular shape. The adjacent edges of the plate 14 are provided with outwardly offset lip portions 18, 19 and 20, respectively, substantially as shown.

The adapter 21 comprises a rearward section 22 of rectangular shape corresponding to the area 17 and an integral forward section 23 in a plane outwardly offset from that of the section 22 at the rearwardly facing edge 24 of the plate 14, by virtue of which the edge 24 acts as abutment for the forward edges 25 of the section 22 when the adapter is in place and hence resisting its moving out of place accidently. By these means, the adapter actually snaps into place and is not likely to become unseated without the operator deliberately pushing it out of the seat thus formed by the cut out area 17.

The forward section 23 is essentially flat and smooth having a pair of oppositely facing channels 26 and 27 at the top and bottom, respectively, to engage the corresponding rabbeted edges 28 and 29 of a block 30 secured to the back of the housing of the light meter 12. The block 30 is secured to the light meter housing by screws 31 or by any other suitable means in a position so that the forward light receiving end 32 of the light meter is alongside the tube 13 and faces in the same direction.

An abutment 33 for the block 30 is provided on the adapter by striking outwardly a small portion of the material in line with the rearward ends of the channels 26 and 27.

Stops 34 and 35 are also provided at the rear end of the adapter 21 for abutting the forwardly facing edges of the lip portion 19.

An aperture 36 is provided in the section 22 for receiving a holding screw 37 in registry with a threaded recess 38 of the camera housing, for additional or optional use, particularly where a more permanent type of attachment is desired under conditions of prolonged continual use.

Having thus described my invention, I claim:

1. A mounting for a light meter on a camera comprising in combination a plate secured to the camera housing, said plate having an opening therein, a bracket having a first portion thereof substantially conforming in size and shape to said opening and being adapted to be disposed therein, said plate having flanges adjacent the opening for retaining said portion therein, said bracket having a second portion integral with and extending from the first portion, a block member, means for securing the block member to the light meter, and means integral with said second portion for slidably engaging and supporting said block member.

2. A mounting as defined by claim 1 in which the said first portion has an aperture therethrough for receiving a bolt.

3. In combination with a camera housing having a lens tube extending therefrom for receiving light from objects to be photographed, a light meter having a light receiving end, said meter being disposed with its light receiving end alongside said tube, and a plate secured to the camera housing, said plate having an opening therein, a bracket having a first portion thereof substantially conforming in size and shape to said opening and being disposed therein, said plate having flanges adjacent the opening for retaining the said portion therein, said bracket having a second portion integral with and extending from the first portion, a block member secured to the light meter, and means integral with said second portion slidably engaging the block member and supporting it together with the light meter.

4. An adapter for removably securing a light meter to a camera housing, said adapter comprising a plate having a rearward section and a forward section, said sections being mutually offset in different parallel planes, said rearward section being adapted to be removably disposed in a recess of a conventional camera housing, said forward section having channels for slidably engaging and releasably holding a block member, and means for securing the block member to the light meter.

5. An adapter for removably securing a light meter to a camera housing, said adapter comprising a plate having a rearward section and a forward section, said sections being mutually offset in different parallel planes, said rearward section being adapted to be removably disposed in a recess of a conventional camera housing, means for releasably holding the said rearward section in the recess, said forward section having channels for slidably engaging and releasably holding a block member, and means for securing the block member to the light meter.

References Cited in the file of this patent

UNITED STATES PATENTS

| | | |
|---|---|---|
| 2,178,361 | Riepert | Oct. 31, 1939 |
| 2,360,256 | Mihalyi | Oct. 10, 1944 |
| 2,596,328 | Dorsey | May 13, 1952 |
| 2,630,049 | Stein | Mar. 3, 1953 |